(12) United States Patent
Kimura et al.

(10) Patent No.: US 10,669,916 B2
(45) Date of Patent: Jun. 2, 2020

(54) EXHAUST SYSTEM FOR AN INTERNAL COMBUSTION ENGINE

(71) Applicant: TOYOTA JIDOSHA KABUSHIKI KAISHA, Toyota-shi, Aichi-ken (JP)

(72) Inventors: Koichi Kimura, Numazu (JP); Yasuyuki Irisawa, Susono (JP); Takashi Tsunooka, Gotemba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/026,774

(22) Filed: Jul. 3, 2018

(65) Prior Publication Data

US 2019/0010854 A1 Jan. 10, 2019

(30) Foreign Application Priority Data

Jul. 4, 2017 (JP) ................................. 2017-131127

(51) Int. Cl.
*F01N 13/00* (2010.01)
*F01N 3/28* (2006.01)
*F02B 37/18* (2006.01)
*F02B 37/02* (2006.01)

(52) U.S. Cl.
CPC ............. *F01N 13/008* (2013.01); *F01N 3/28* (2013.01); *F02B 37/02* (2013.01); *F02B 37/183* (2013.01); *F01N 2340/06* (2013.01); *F01N 2560/025* (2013.01)

(58) Field of Classification Search
CPC ............... F01N 13/008; F01N 2340/06; F01N 2560/025; F01N 3/28; F02B 37/02; F02B 37/183
See application file for complete search history.

(56) References Cited

U.S. PATENT DOCUMENTS

| 4,444,012 | A | * | 4/1984 | Gauffres | ............... | F01N 3/2053 |
| | | | | | | 60/276 |
| 7,748,216 | B2 | * | 7/2010 | Eiraku | .................. | F01N 13/008 |
| | | | | | | 204/428 |
| 10,024,255 | B2 | * | 7/2018 | Ulrey | ....................... | F01N 11/00 |
| 10,094,271 | B2 | * | 10/2018 | Fujioka | ................. | F02B 37/183 |
| 10,100,690 | B2 | * | 10/2018 | Caine | .................. | F02D 41/0255 |
| 2009/0292446 | A1 | * | 11/2009 | Tanaka | .................... | F02B 37/18 |
| | | | | | | 701/103 |

(Continued)

FOREIGN PATENT DOCUMENTS

| JP | 2003-254051 | 9/2003 |
| JP | 2013-204518 | 10/2013 |
| JP | 2014-013004 | 1/2014 |

*Primary Examiner* — Jesse S Bogue
(74) *Attorney, Agent, or Firm* — Finnegan, Henderson, Farabow, Garrett & Dunner, LLP

(57) ABSTRACT

In a construction in which a turbine and an exhaust gas purification catalyst are arranged close to each other, and in which an exhaust gas sensor is arranged in an exhaust passage between the turbine and the exhaust gas purification catalyst, the exhaust gas sensor is suppressed from getting wet with condensed water. In an exhaust system for an internal combustion engine, an exhaust gas sensor is arranged in a circumferential direction of a specific exhaust passage in a position except a range which is reached by a bypass exhaust gas carried away by a turbine swirling flow.

3 Claims, 10 Drawing Sheets

(56) References Cited

U.S. PATENT DOCUMENTS

2012/0222418 A1* 9/2012 Watanabe ............ F02B 37/183
60/602
2016/0084152 A1* 3/2016 Fujioka ................ F02B 37/183
60/602

* cited by examiner

[FIG. 1]
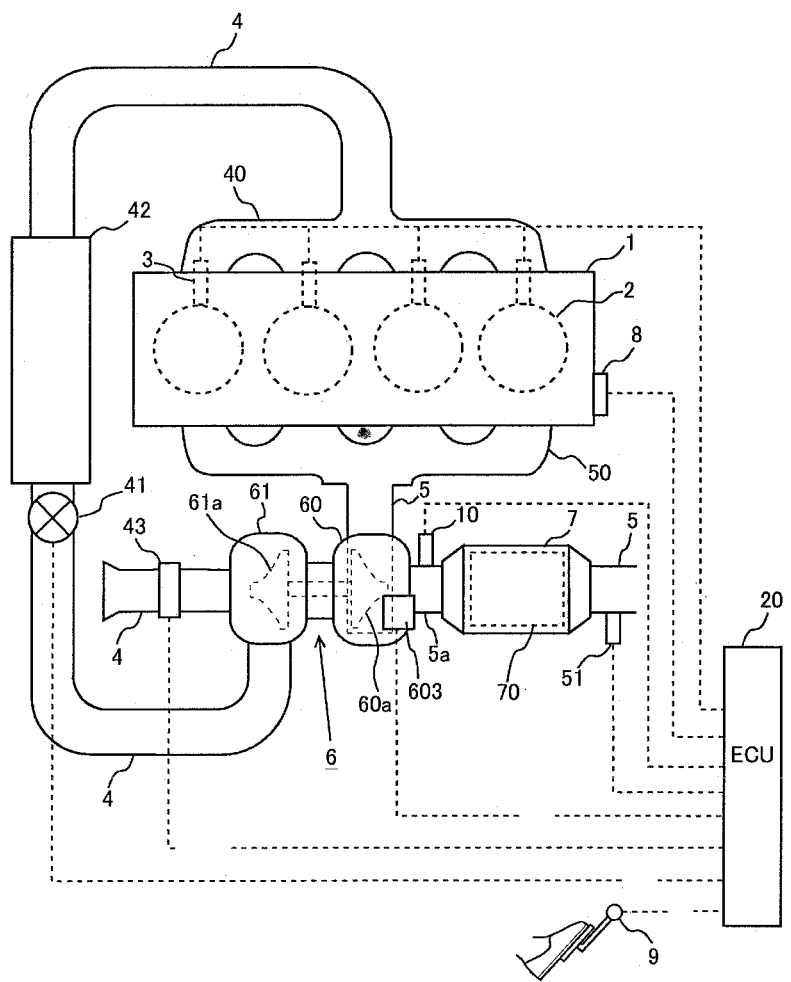

[FIG. 2A]
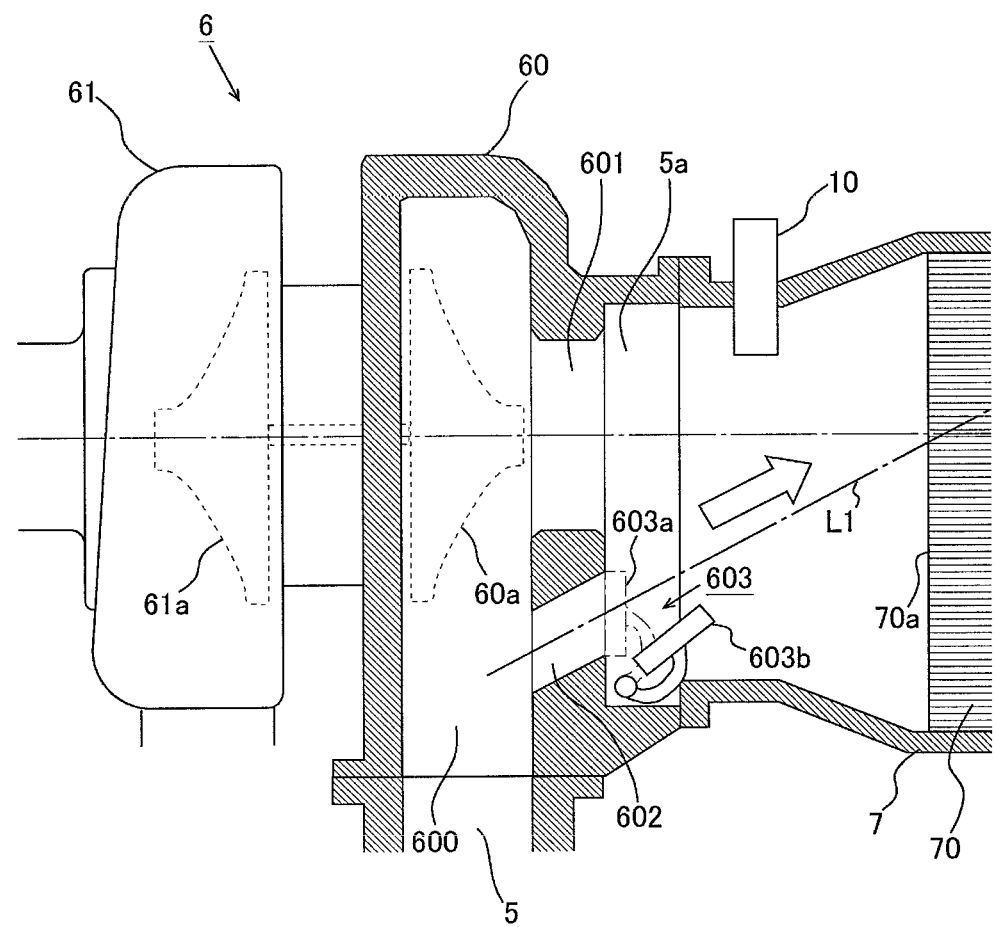

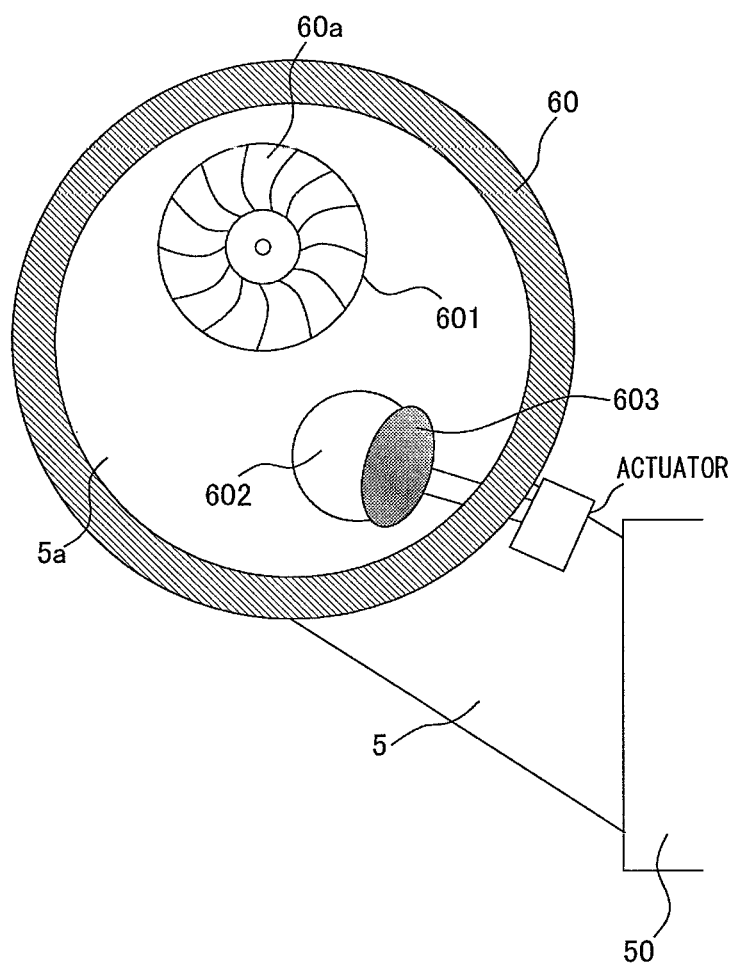
[FIG. 2B]

[FIG. 3]
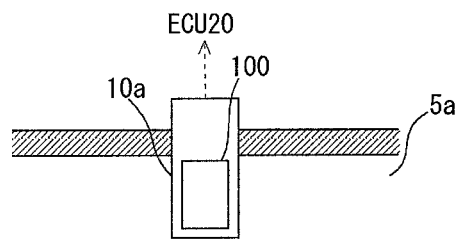
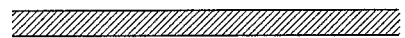
[FIG. 4]
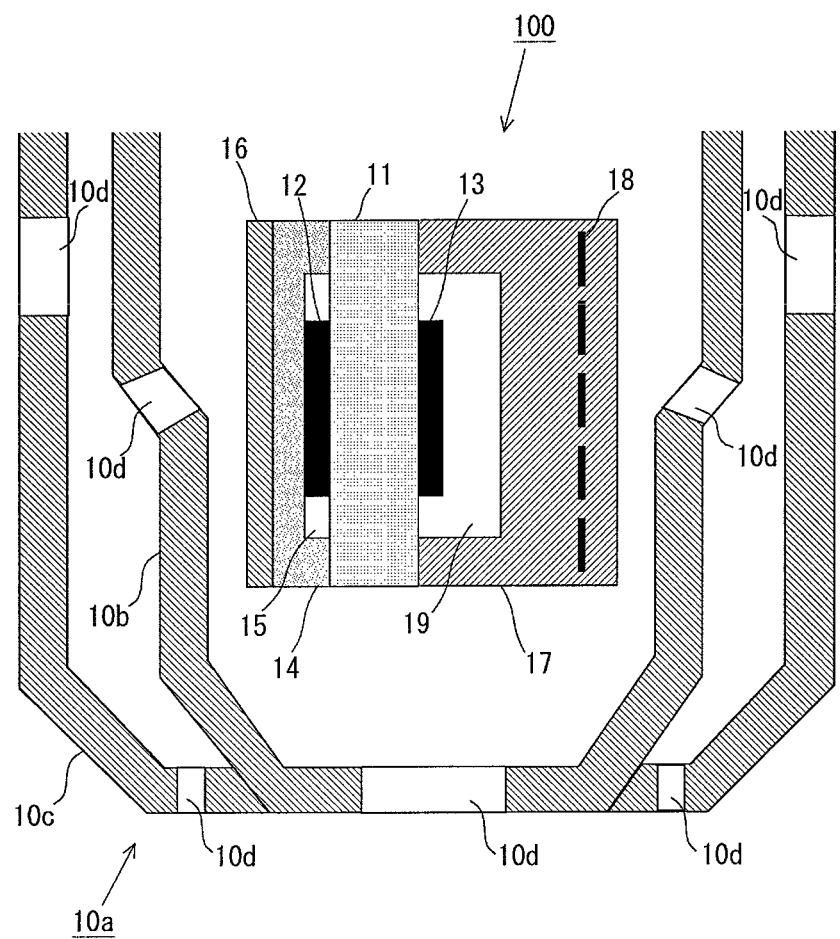

[FIG. 5]
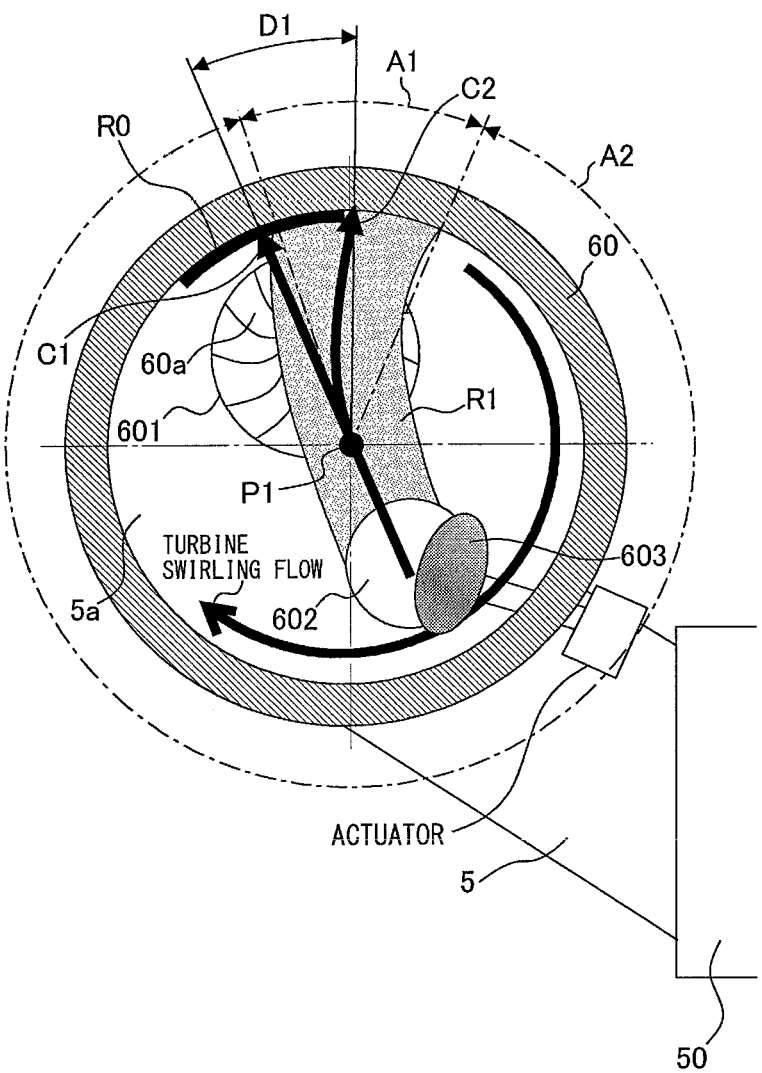

[FIG. 6]
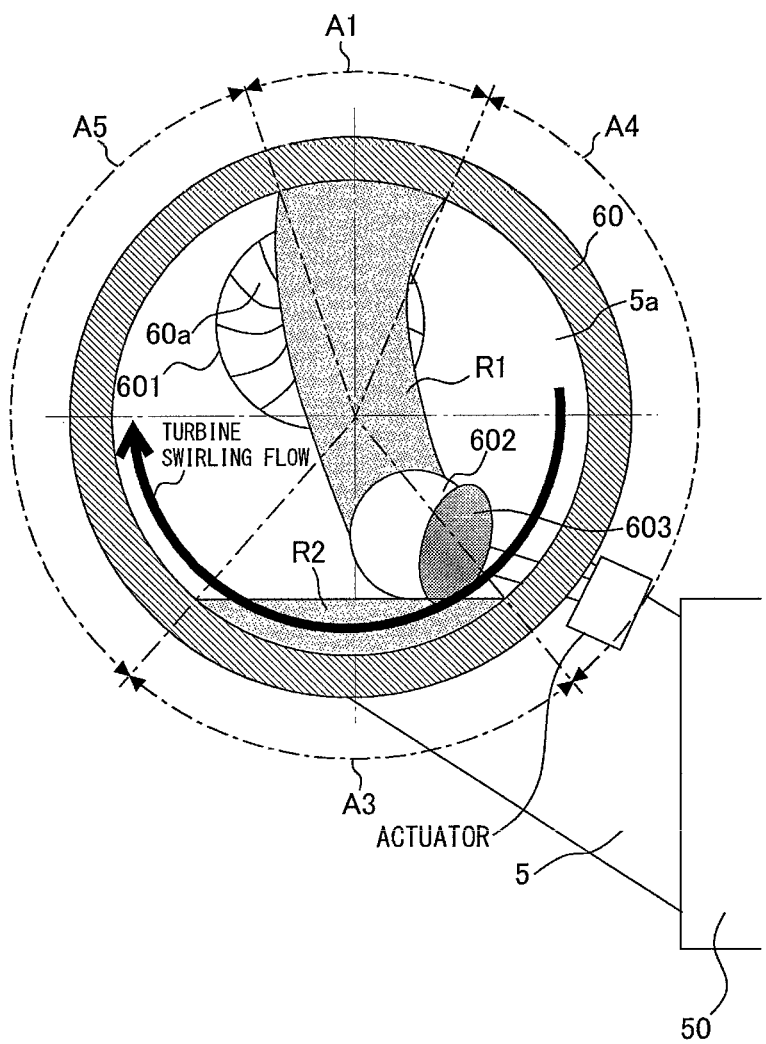

[FIG. 7A]
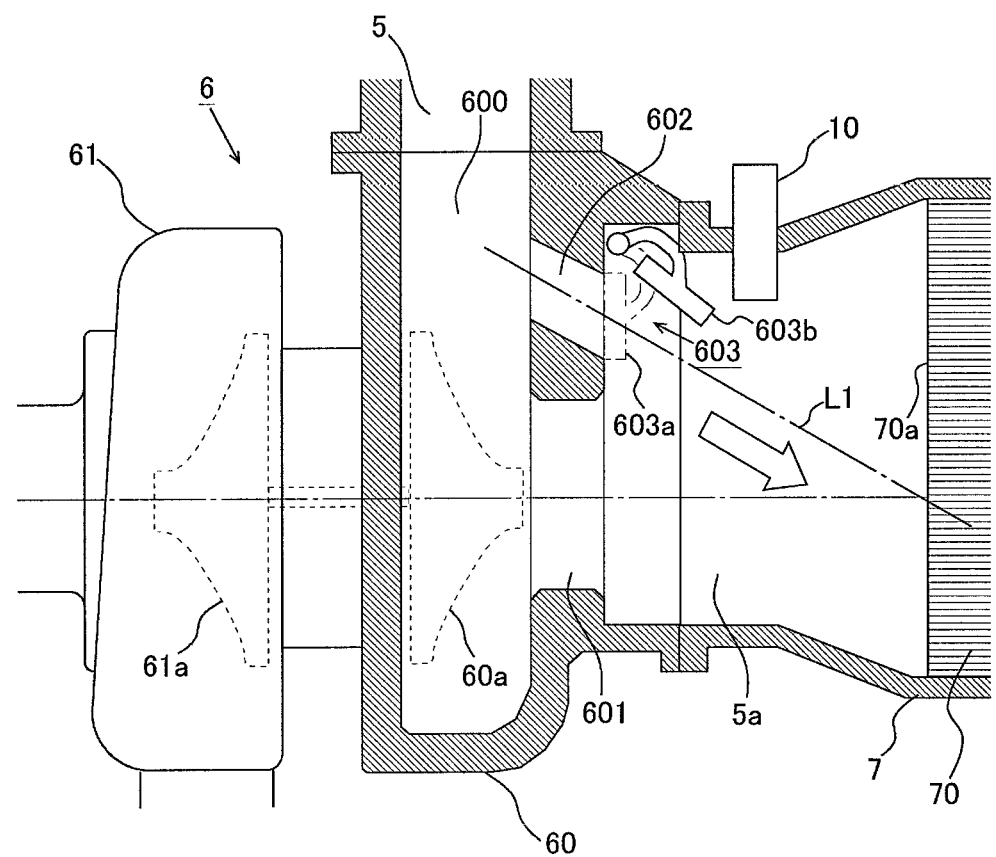

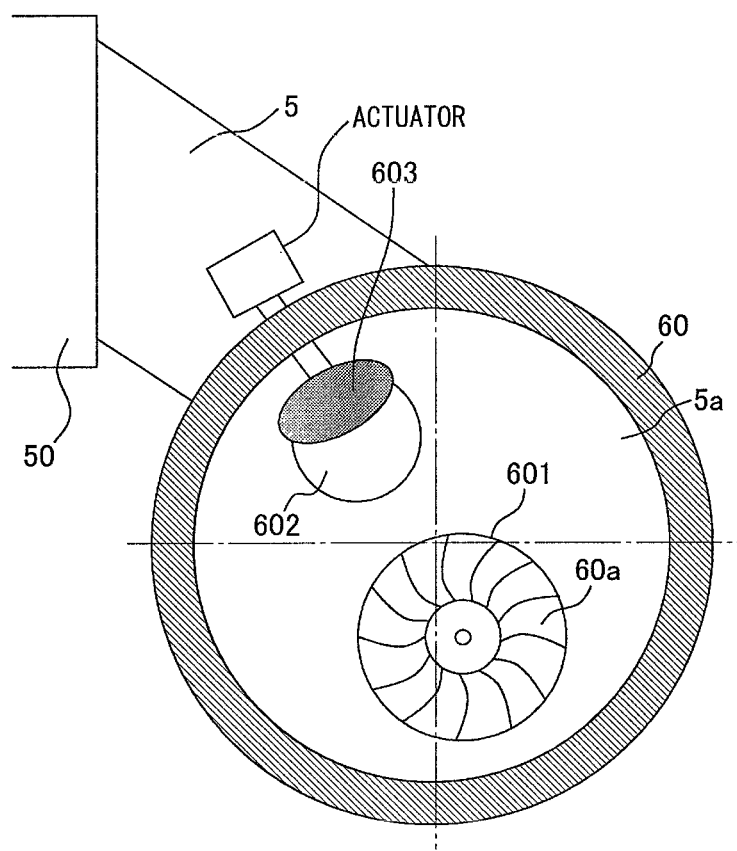
[FIG. 7B]

[FIG. 8]
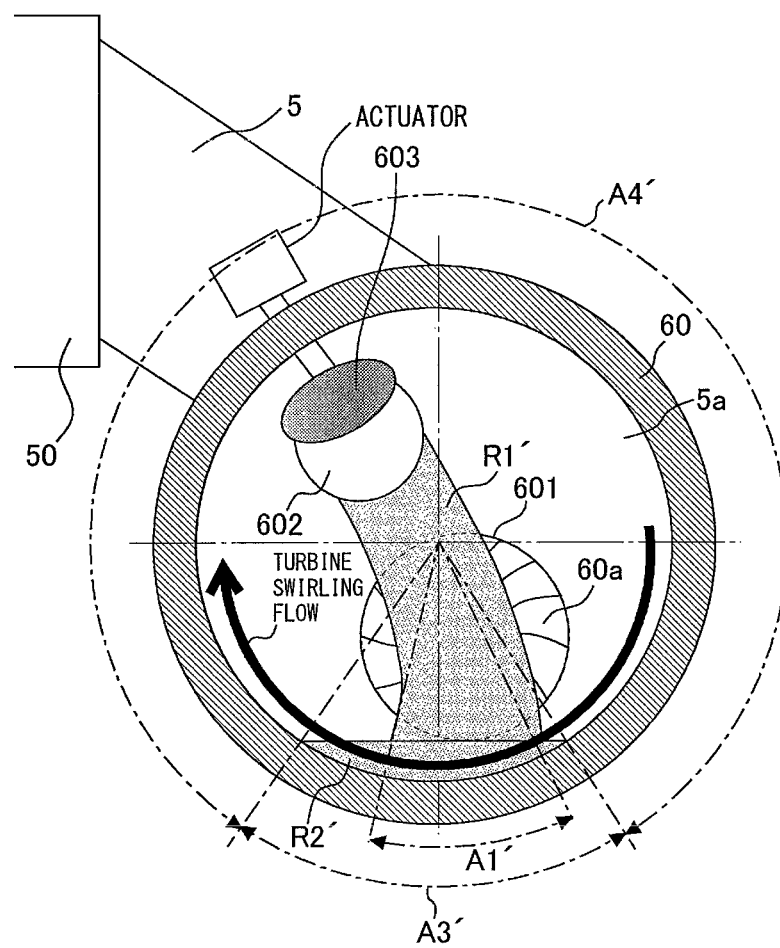

[FIG. 9]
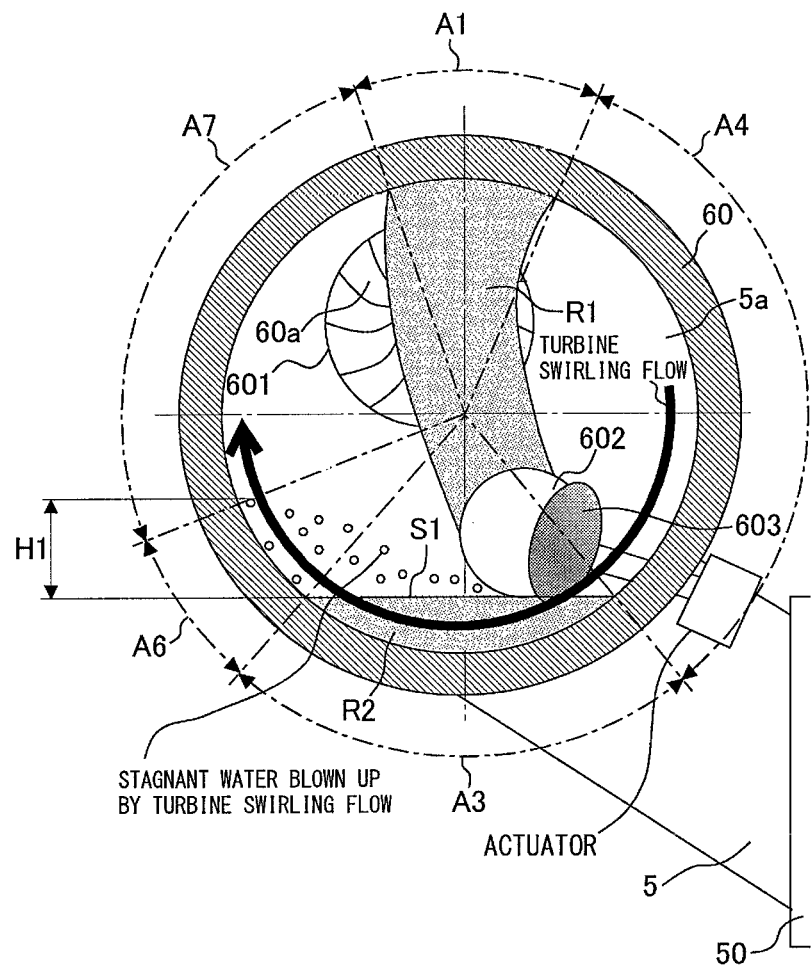

EXHAUST SYSTEM FOR AN INTERNAL COMBUSTION ENGINE

CROSS-REFERENCE TO RELATED APPLICATIONS

This application claims priority to Japanese Patent Application No. 2017-131127 filed on Jul. 4, 2017, the entire contents of which are incorporated by reference.

BACKGROUND

Technical Field

The present disclosure relates to an exhaust system for an internal combustion engine which is provided with an exhaust gas turbine supercharger (turbocharger) that drives a compressor of centrifugal type using exhaust gas energy, an exhaust gas purification catalyst that is arranged at the downstream side of a turbine of the turbocharger, and an exhaust gas sensor that is arranged between the turbine and the exhaust gas purification catalyst.

Description of the Related Art

In a construction in which a turbine of a turbocharger is arranged in an exhaust passage of an internal combustion engine, there may be formed a bypass passage bypassing the turbine. Then, in patent literature 1, there is disclosed a technology in which an air fuel ratio sensor is arranged in an exhaust passage at the downstream side of a turbine and a bypass passage. According to this technology, the air fuel ratio sensor is arranged in such a manner that, before an exhaust gas flowing out from the turbine into an exhaust passage (hereinafter, sometimes referred to as a "turbine exhaust gas") is mixed with an exhaust gas flowing out from the bypass passage into the exhaust passage (hereinafter, sometimes referred to as a "bypass exhaust gas"), the air fuel ratio sensor is impinged by the turbine exhaust gas.

In addition, it has become common that an exhaust gas purification catalyst is arranged in an exhaust passage of an internal combustion engine at the downstream side of turbine of a turbocharger and a bypass passage. Then, in patent literature 2, there is disclosed a technology in which a wastegate valve (hereinafter, sometimes referred to as a "WGV") is arranged in a bypass passage, wherein the WGV is opened at the time of cold start of an internal combustion engine. According to this technology, an exhaust gas purification catalyst arranged at the downstream side of the bypass passage is raised in temperature by using an exhaust gas of relatively high temperature having passed through the bypass passage.

CITATION LIST

Patent Literature

Patent Literature 1: Japanese Patent Application Laid-Open No. 2014-013004
Patent Literature 2: Japanese Patent Application Laid-Open No. 2003-254051

SUMMARY

Moisture is contained in the exhaust gas discharged from an internal combustion engine, and when the internal combustion engine is in a cold state, the moisture in the exhaust gas can become condensed water in an exhaust passage. Then, when condensed water is generated in the exhaust passage at the upstream side of a turbine, in the turbine, or in a bypass passage, the condensed water will flow out from an outlet portion of the turbine or an outlet portion of the bypass passage into the exhaust passage. Here, when an exhaust gas sensor arranged in the exhaust passage is exposed to the condensed water, abnormality may occur in the exhaust gas sensor.

On the other hand, in the past, it is known that when an internal combustion engine is in a cold state, an exhaust gas purification catalyst is raised in temperature by using a bypass exhaust gas which is higher in temperature than a turbine exhaust gas. In this case, in order to raise the temperature of the exhaust gas purification catalyst as quickly as possible, it is considered to increase the bypass exhaust gas as much as possible with respect to the turbine exhaust gas. Here, if the bypass exhaust gas is increased as much as possible, condensed water flowing out from an outlet portion of a bypass passage into an exhaust passage increases. Accordingly, the possibility of an exhaust gas sensor being exposed to the condensed water flowing out from the bypass passage together with the bypass exhaust gas becomes high.

Then, according to the technologies described in the prior art literatures, etc., it is known that an air fuel ratio sensor (exhaust gas sensor) is arranged in a position where it is impinged by a turbine exhaust gas before being mixed with a bypass exhaust gas. In this case, it is considered that the wetting of the sensor by condensed water flowing with the bypass exhaust gas is suppressed. However, in a construction in which a turbine and an exhaust gas purification catalyst are arranged close to each other for the purpose of raising the temperature of the exhaust gas purification catalyst as quickly as possible, it is difficult to arrange the exhaust gas sensor in the position where it is impinged by the turbine exhaust gas before being mixed with the bypass exhaust gas.

In other words, in the construction in which the exhaust gas sensor is arranged in the exhaust passage between the turbine and the exhaust gas purification catalyst, in the case where the turbine and the exhaust gas purification catalyst are arranged close to each other, it becomes more difficult to arrange the exhaust gas sensor in a position where the wetting of the exhaust gas sensor by the condensed water flowing with the bypass exhaust gas can be suppressed, as compared with the case where they are arranged otherwise. Accordingly, in the present disclosure, it has been newly focused on the sensor position from a point of view of a circumferential direction of the exhaust passage.

The present disclosure n has been made in view of the problems as referred to above, and an object of the present disclosure is to provide a technology that can suppress an exhaust gas sensor from getting wet with condensed water, in a construction in which a turbine and an exhaust gas purification catalyst are arranged close to each other, and in which the exhaust gas sensor is arranged in an exhaust passage between the turbine and the exhaust gas purification catalyst.

Solution to Problem

In an exhaust system for an internal combustion engine according to the present disclosure, an exhaust gas sensor is arranged in a position in a circumferential direction of an exhaust passage between a turbine and an exhaust gas purification catalyst, except a range that is reached by a bypass exhaust gas at the time when the internal combustion engine is in a cold state, said bypass exhaust gas being carried away by a swirling exhaust gas flowing through the exhaust passage while swirling along wall surface thereof.

More specifically, an exhaust system for an internal combustion engine according to the present disclosure comprises: a turbocharger with a turbine that is arranged in an exhaust passage of said internal combustion engine; an exhaust gas purification catalyst that is arranged in said exhaust passage at a location downstream of said turbine; a bypass passage that branches from said exhaust passage at a location upstream of said turbine, and merges into said exhaust passage at a location upstream of said exhaust gas purification catalyst, while bypassing said turbine; a waste gate valve that is able to change an exhaust gas channel cross section in said bypass passage; and an exhaust gas sensor that is arranged in a specific exhaust passage which is a portion of said exhaust passage between said turbine and said exhaust gas purification catalyst; wherein said turbine and said exhaust gas purification catalyst are arranged in such a manner that an outlet portion of said turbine and an upstream side end face of said exhaust gas purification catalyst are in a predetermined proximity state, and that an extension line of an axis of rotation of said turbine intersects the upstream side end face of said exhaust gas purification catalyst, without intersecting a wall surface of said specific exhaust passage; it is further constructed such that when said internal combustion engine is in a cold state and a degree of opening of said wastegate valve is a predetermined degree of opening, the bypass exhaust gas flowing out from said bypass passage into said specific exhaust passage is directed to the upstream side end face of said exhaust gas purification catalyst; and said exhaust gas sensor is arranged in a position in a circumferential direction of said specific exhaust passage, except a first range that is a range to be reached by said bypass exhaust gas at the time when said internal combustion engine is in a cold state, said bypass exhaust gas being carried away by a swirling exhaust gas flowing out from said turbine into said specific exhaust passage and flowing through said specific exhaust passage while swirling along the wall surface thereof.

In such an internal combustion engine, the outlet portion of the turbine and the upstream side end face of the exhaust gas purification catalyst are in the predetermined proximity state, so in said specific exhaust passage, heat dissipation from the exhaust gas to the passage wall thereof is suppressed. Here, the predetermined proximity state is a state where the turbine and the exhaust gas purification catalyst are arranged in such a manner that a ratio of a distance from the outlet portion of the turbine to the upstream side end face of the exhaust gas purification catalyst with respect to a diameter of the exhaust gas purification catalyst falls within a predetermined range in the vicinity of 1.0. In addition, it is constructed such that the bypass exhaust gas is directed to the upstream side end face of the exhaust gas purification catalyst when the internal combustion engine is in the cold state and the degree of opening of the WGV is the predetermined degree of opening, so the heat of the bypass exhaust gas is transmitted to the exhaust gas purification catalyst in an efficient manner. In other words, said internal combustion engine is constructed so as to be able to raise the temperature of the exhaust gas purification catalyst as quickly as possible.

Here, expressing said predetermined degree of opening in another way, it is a degree of opening of the WGV at the time when the internal combustion engine is in the cold state (hereinafter, sometimes referred to as a "cold time opening degree"). Then, this cold time opening degree is a degree of opening at which the temperature of the exhaust gas purification catalyst can be raised as fast as possible by using the bypass exhaust gas. The cold time opening degree is a fully opened degree of the WGV, for example. In this case, the bypass exhaust gas can be increased as much as possible with respect to the turbine exhaust gas. Or, the cold time opening degree is, for example, a degree of opening at which the bypass exhaust gas is directed to a substantially central portion of the upstream side end face of the exhaust gas purification catalyst. In this case, it becomes easier to raise the temperature of the exhaust gas purification catalyst.

Then, when the degree of opening of the WGV is made to the cold time opening degree, the flow rate of the bypass exhaust gas becomes larger than the flow rate of the turbine exhaust gas. Here, the condensed water flowing out from the bypass passage into the specific exhaust passage has a tendency to flow through the specific exhaust passage, while being carried by a flow of the bypass exhaust gas. For that reason, when the internal combustion engine is in the cold state, it becomes easy to cause sensor wetting by the condensed water flowing with the flow of the bypass exhaust gas. Accordingly, it is desirable that the exhaust gas sensor be arranged in a position which is not reached by the bypass exhaust gas.

Here, the bypass exhaust gas is carried away by a flow of swirling exhaust gas (hereinafter, sometimes referred to as a "turbine swirling flow") which is a turbine exhaust gas flowing through the specific exhaust passage while swirling along the wall surface thereof. Accordingly, in the present disclosure, it has been carried out an earnest study on an arrangement of the exhaust gas sensor in the point of view of the circumferential direction of the specific exhaust passage, after taking into consideration the influence of the turbine swirling flow on the bypass exhaust gas.

According to this, the direction of the flow of the bypass exhaust gas is bent by the swirl direction of the swirling exhaust gas. Here, in the exhaust system for an internal combustion engine according to the present disclosure, it is constructed such that the bypass exhaust gas is directed to the upstream side end face of the exhaust gas purification catalyst when the internal combustion engine is in the cold state, but an actual bypass exhaust gas at this time may diffuse to some extent, before flowing into the upstream side end face of the exhaust gas purification catalyst. For that reason, even when the internal combustion engine is in the cold state, the bypass exhaust gas may reach the vicinity of the wall surface of the specific exhaust passage, too. At this time, in the vicinity of the wall surface of the specific exhaust passage, the flow of the bypass exhaust gas will be bent by the turbine swirling flow. Then, when the internal combustion engine is in the cold state, the bypass exhaust gas bent by the turbine swirling flow in this manner will reach said first range in the circumferential direction of the specific exhaust passage.

Then, when the exhaust gas sensor is arranged in a position except the first range in the circumferential direction of the specific exhaust passage, the sensor wetting by the condensed water flowing while being carried on the flow of the bypass exhaust gas is suppressed. This makes it possible to suppress the exhaust gas sensor from getting wet with condensed water, in the construction in which the turbine and the exhaust gas purification catalyst are arranged close to each other, and in which the exhaust gas sensor is arranged in the exhaust passage between the turbine and the exhaust gas purification catalyst.

In addition, said first range may be set as a range including a region to which a region in the case of assuming that said bypass exhaust gas at the time when said internal combustion engine is in the cold state has reached the wall surface of said specific exhaust passage without being carried away by said swirling exhaust gas is moved by a predetermined angle in the swirl direction of said swirling exhaust gas.

As mentioned above, in the vicinity of the wall surface of the specific exhaust passage, the exhaust gas is bent by the turbine swirling flow. Specifically, the bypass exhaust gas in the case of assuming that it is not carried away by the turbine swirling flow reaches a predetermined region in the wall surface of the specific exhaust passage. In contrast to this, when the bypass exhaust gas is carried away by the turbine swirling flow, the bypass exhaust gas will reach a region to which said predetermined region is moved by the predetermined angle in the swirl direction of the swirling exhaust gas.

Moreover, in view of the fact that the ratio of the flow rate of the turbine exhaust gas and the flow rate of the bypass exhaust gas changes according to the degree of opening of the WGV, an extent by which the bypass exhaust gas is carried away by the turbine swirling flow will change according to the degree of opening of the WGV. This is because the magnitude of the turbine swirling flow is affected by the influence of the flow rate of the turbine exhaust gas which changes according to the degree of opening of the WGV. Accordingly, said predetermined angle is defined as an angle corresponding to said predetermined degree of opening which is the degree of opening (the cold time opening degree) of the WGV at the time when the internal combustion engine is in the cold state.

Further, in the exhaust system for an internal combustion engine according to the present disclosure, said exhaust gas sensor may further be arranged in the circumferential direction of said specific exhaust passage in a position within a range in which it is positioned vertically downward and except a range in which stagnant water, which is condensed water staying in said specific exhaust passage, stays.

Here, the condensed water attached the wall surface of the specific exhaust passage (including condensed water generated on the wall surface, too) flows in the direction of gravity. In addition, for example, a part of the condensed water flowing out from the outlet portion of the turbine into the specific exhaust passage falls downward in the gravity direction in the specific exhaust passage. As a result, the condensed water can stay in the predetermined region in the specific exhaust passage (i.e., this being a region located downward in the vertical direction in the specific exhaust passage). Then, if the exhaust gas sensor is arranged in this region, there will be a fear that the exhaust gas sensor may get wet with water.

Accordingly, by arranging the exhaust gas sensor in a position except the range in which the stagnant water stays in the circumferential direction of the specific exhaust passage, it is possible to suppress the wetting of the exhaust gas sensor by the stagnant water.

In addition, in the exhaust system for an internal combustion engine according to the present disclosure, said exhaust gas sensor may further be arranged in the circumferential direction of said specific exhaust passage in a position except a range which is reached by said stagnant water blown up by said swirling exhaust gas in the swirl direction thereof.

As described above, the swirling exhaust gas is the turbine exhaust gas flowing through the specific exhaust passage, while swirling along the wall surface thereof. For that reason, not only the bypass exhaust gas but also said stagnant water is affected by the influence of the flow of this swirling exhaust gas (the turbine swirling flow). Here, the stagnant water is blown up in the swirl direction of the swirling exhaust gas. Accordingly, the stagnant water blown up by the swirling exhaust gas will reach a certain range in the circumferential direction of the specific exhaust passage. Hereinafter, this range is referred to as a "second range". Then, if the exhaust gas sensor is arranged in the second range in the circumferential direction of the specific exhaust passage, there will be a fear that the exhaust gas sensor may get wet with water.

Accordingly, by arranging the exhaust gas sensor in a position except the second range in the circumferential direction of the specific exhaust passage, it is possible to suppress the wetting of the exhaust gas sensor by the condensed water.

According to the present disclosure, it is possible to suppress an exhaust gas sensor from getting wet with condensed water, in a construction in which a turbine and an exhaust gas purification catalyst are arranged close to each other, and in which the exhaust gas sensor is arranged in an exhaust passage between the turbine and the exhaust gas purification catalyst.

BRIEF DESCRIPTION OF DRAWINGS

FIG. 1 is a diagram showing the general configuration of an internal combustion engine and its exhaust system according to an embodiment of the present disclosure.

FIG. 2A is a diagram showing a longitudinal cross section of a turbine housing according to a first embodiment of the present disclosure.

FIG. 2B is a diagram showing a transverse cross section of the turbine housing according to the first embodiment of the present disclosure.

FIG. 3 is an enlarged schematic cross sectional view in the vicinity of an air fuel ratio sensor in FIG. 1.

FIG. 4 is a longitudinal cross sectional view in the vicinity of a tip end of the air fuel ratio sensor.

FIG. 5 is a diagram for explaining an arrangement structure of the air fuel ratio sensor according to the first embodiment of the present disclosure.

FIG. 6 is a diagram for explaining an arrangement structure of an air fuel ratio sensor according to a second embodiment of the present disclosure.

FIG. 7A is a diagram showing a longitudinal cross section of a turbine housing according to a modification of the second embodiment of the present disclosure.

FIG. 7B is a diagram showing a transverse cross section of the turbine housing according to the modification of the second embodiment of the present disclosure.

FIG. 8 is a diagram for explaining an arrangement structure of an air fuel ratio sensor according to the modification of the second embodiment of the present disclosure.

FIG. 9 is a diagram for explaining an arrangement structure of an air fuel ratio sensor according to a third embodiment of the present disclosure.

DESCRIPTION OF EMBODIMENTS

In the following, modes for carrying out the present disclosure will be specifically described as embodiments for illustrative purposes with reference to the drawings. It should be understood that the dimensions, materials, shapes, relative arrangements, and other features of the components that will be described in connection with the embodiments are not intended to limit the technical scope of the present disclosure only to them, unless stated otherwise.

<First Embodiment>
(General Configuration of Internal Combustion Engine and its Exhaust System)

FIG. 1 is a diagram showing the general configuration of an internal combustion engine and its exhaust system according to a first embodiment of the present disclosure. The internal combustion engine 1 shown in FIG. 1 is a spark ignition type internal combustion engine (gasoline engine) provided with a cylinder group including four cylinders 2. However, the present disclosure can also be applied to a compression ignition type internal combustion engine (diesel engine). On the internal combustion engine 1, there are mounted fuel injection valves 3 for injecting fuel into individual intake ports of the cylinders respectively. Here, note that the fuel injection valves 3 may be constructed in such a manner as to directly inject fuel into the individual cylinders 2. In addition, on the individual cylinders 2, there are mounted spark plugs (illustration omitted) for igniting air fuel mixtures in the cylinders, respectively.

An intake manifold 40 and an exhaust manifold 50 are connected to the internal combustion engine 1. An intake passage 4 is connected to the intake manifold 40. In the middle of this intake passage 4, there is arranged compressor housing 61 of a turbocharger 6 that is driven to operate with the use of the energy of exhaust gas as a driving source. A compressor 61a is rotatably accommodated in the compressor housing 61. Then, a throttle valve 41 is arranged in the intake passage 4 at the downstream side of the compressor housing 61. The throttle valve 41 serves to adjust the amount of intake air in the internal combustion engine 1 by changing the intake air channel cross sectional area of the intake passage 4. Then, in the intake passage 4 at the downstream side of the throttle valve 41, there is arranged an intercooler 42 for performing heat exchange between intake air and outside air. Also, an air flow meter 43 is arranged in the intake passage 4 at the upstream side of the compressor housing 61. The air flow meter 43 outputs an electrical signal corresponding to an amount (mass) of intake air (air) flowing in the intake passage 4.

On the other hand, an exhaust passage 5 is connected to the exhaust manifold 50. Then, in the middle of the exhaust passage 5, there are arranged a turbine housing 60 of the turbocharger 6, an air fuel ratio sensor 10, a catalyst casing 7, and a temperature sensor 51 in order according to the flow of the exhaust gas. A turbine 60a is, rotatably accommodated in the turbine housing 60. In addition, an exhaust gas purification catalyst 70 is accommodated in the catalyst casing 7. The exhaust gas purification catalyst 70 is, for example, a three-way catalyst. Moreover, the air fuel ratio sensor 10 outputs an electrical signal corresponding to the air fuel ratio of the exhaust gas flowing into the exhaust gas purification catalyst 70. The details of this air fuel ratio sensor 10 will be described later. Also, the temperature sensor 51 outputs an electrical signal corresponding to the temperature of the exhaust gas. Here, note that in this embodiment, the air fuel ratio sensor 10 corresponds to an exhaust gas sensor in the present disclosure. However, the exhaust gas sensor in the present disclosure is not limited to the air fuel ratio sensor, as will be described later.

Here, the turbine housing 60 is provided with turbine inlet portion 600 for introducing exhaust gas from the exhaust passage 5 to the turbine 60a, and a turbine outlet portion 601 that introduces the exhaust gas having passed through the turbine 60a to a specific exhaust passage 5a, which is a portion of the exhaust passage 5 between the turbine 60a and the exhaust gas purification catalyst 70, as shown in FIG. 2A. In addition, a bypass passage 602 for introducing the exhaust gas from the exhaust passage 5 to the specific exhaust passage 5a by bypassing the turbine 60a is formed in the turbine housing 60. Then, the bypass passage 602 is constructed so that an extension line (an alternate long and short dash line L1 in FIG. 2A) of the axis of the bypass passage 602 intersects an upstream side end face 70a of the exhaust gas purification catalyst 70 (hereinafter, sometimes referred to simply as an "upstream side end face 70a"). Also, it is constructed such that an extension line of the axis of rotation of the turbine 60a intersects the upstream side end face 70a, without intersecting the wall surface of the specific exhaust passage 5a.

In addition, the turbine housing 60 is provided with a waste gate valve 603 (hereinafter, sometimes referred to as a "WGV 603") which is arranged at the outlet side of the bypass passage 602, and which can change an exhaust gas channel cross sectional area in the bypass passage 602. This WGV 603 is controlled by the ECU 20 which will be described later. Here, in FIG. 2A, there are shown a state where the WGV 603 is in a fully closed state (WGV 603a), and a state where the WGV 603 is in a fully opened state (WGV 603b). Then, the direction of flow of the exhaust gas (hereinafter, sometimes referred to as a "bypass exhaust gas") flowing out from the bypass passage 602 into the specific exhaust passage 5a when the WGV 603 is in the fully opened state becomes a direction along the axis of the bypass passage 602, as shown by an outlined arrow in FIG. 2A. In other words, the bypass passage 602 directs the direction of the flow of the bypass exhaust gas to the upstream side end face 70a, in the state where the WGV 603 is in the fully opened state.

Here, note that in this embodiment, as shown in FIG. 2B, the exhaust passage 5 connected at one end thereof to the exhaust manifold 50 extends upward, and the other end of the exhaust passage 5, which is opposite to the side connected to the exhaust manifold 50, is connected to the turbine housing 60. In the turbine housing 60 connected to such an exhaust passage 5, the turbine 60a is arranged above the bypass passage 602.

Moreover, in the exhaust system for an internal combustion engine according to this embodiment, the turbine outlet portion 601 and the upstream side end face 70a are arranged in a predetermined proximity state. Here, the predetermined proximity state is a state where the turbine 60a and the exhaust gas purification catalyst 70 are arranged in such a manner that a value obtained by dividing the value of a distance from the turbine outlet portion 601 to the upstream side end face 70a by the value of a diameter of the exhaust gas purification catalyst 70 falls within a range from 0.8 to 1.3, for example. In this embodiment, for example, the value of the distance from the turbine outlet portion 601 to the upstream side end face 70a is 100 mm, and the value of the diameter of the exhaust gas purification catalyst 70 is 120 mm. Then, when the turbine 60a and the exhaust gas purification catalyst 70 are arranged in such a manner, heat dissipation from the exhaust gas to the passage wall in the specific exhaust passage 5a is suppressed. In addition, as mentioned above, in the state where the WGV 603 is fully opened, the bypass exhaust gas directs to the upstream side end face 70a. For that reason, at this time, the heat of the bypass exhaust gas can be transmitted to the exhaust gas purification catalyst 70 in an efficient manner.

Here, reverting to FIG. 1, an electronic control unit (ECU) 20 is provided in combination with the internal combustion engine 1. This ECU 20 is a unit that controls an operating state of the internal combustion engine 1, etc. A variety of kinds of sensors such as a crank position sensor 8, an accelerator opening sensor 9, etc,. in addition to the air fuel ratio sensor 10, the air flow meter 43 and the temperature sensor 51 mentioned above are electrically connected to the ECU 20. The crank position sensor 8 is a sensor which outputs an electrical signal correlated with the rotational position of an engine output shaft (crankshaft) of the internal combustion engine 1. The accelerator opening sensor 9 is a sensor which outputs an electrical signal correlated with an amount of operation (accelerator opening) of an accelerator pedal. Then, the output signals of these sensors are inputted to the ECU 20. The ECU 20 derives an engine rotational speed of the internal combustion engine 1 based on the output signal of the crank position sensor 8, and also derives an engine load of the internal combustion engine 1 based on the output signal of the accelerator opening sensor 9. In addition, the ECU 20 estimates a flow rate of the exhaust gas discharged from the internal combustion engine 1 based on the output value of the air flow meter 43, and also estimates the temperature of the exhaust gas purification catalyst 70 based on the output value of the temperature sensor 51.

Further, a variety of kinds of devices such as the individual fuel injection valves 3, the throttle valve 41, the WGV 603, etc., are electrically connected to the ECU 20. Thus, these variety of kinds of devices are controlled by the ECU 20. For example, the ECU 20 can adjust the flow rate of the exhaust gas flowing through the bypass passage 602, by controlling the degree of opening of the WGV 603 (hereinafter, sometimes referred to as the "WGV opening degree").

Then, the ECU 20 controls the WGV 603 to the fully opened state, when the internal combustion engine 1 is in a cold state. With this, the bypass exhaust gas is made to direct to the upstream side end face 70a, so that the heat of the bypass exhaust gas is transmitted to the exhaust gas purification catalyst 70 in an effective manner. In this manner, the ECU 20 can raise the temperature of the exhaust gas purification catalyst 70 as quickly as possible, by controlling the WGV 603 to the fully opened state when the internal combustion engine 1 is in the cold state.

(Structure of the Air Fuel Ratio Sensor)

Next, the structure of the air fuel ratio sensor 10 will be briefly explained based on FIG. 3 and FIG. 4. Fig. 3 is an enlarged schematic cross sectional view in the vicinity of the air fuel ratio sensor 10 in FIG. 1. Also, FIG. 4 is a longitudinal cross sectional view in the vicinity of a tip end of the air fuel ratio sensor 10.

In FIG. 3, the air fuel ratio sensor 10 is composed of a sensor body 100 to be described later, and a protective cover 10a which is a heat-resistant housing member covering the sensor body 100, with a part thereof being exposed to the specific exhaust passage 5a. The sensor body 100 is covered with the protective cover 10a, so that its mechanical strength is ensured.

Then, as shown in FIG. 4, the protective cover 10a is composed of an inner cover 10b and an outer cover 10c. Then, a plurality of vent holes are formed in the surface of each of these inner and outer covers 10b, 10c, so that the inside and outside of the protective cover 10a are made in communication with each other. That is, the air fuel ratio sensor 10 is constructed so that the exhaust gas circulating or flowing in the specific exhaust passage 5a passes through the vent holes 10d in the protective cover 10a and reaches the sensor body 100. Here, note that in FIG. 4, the protective cover 10a has a dual structure, but it may have a single structure.

Next, the general configuration of the sensor body 100 will be explained. The sensor body 100 is provided with a sensor element 11 which is composed of an oxygen ion conductive solid electrolyte. The sensor element 11 is composed of zirconium oxide (zirconia), for example. Then, the sensor element 11 is formed on one side surface thereof with an exhaust gas side electrode 12 which is exposed to the exhaust gas, and on the other side surface thereof with an atmosphere side electrode 13 which is exposed to the atmosphere. These exhaust gas side electrode 12 and atmosphere side electrode 13 are each composed of metallic material of high catalytic activity, such as platinum. Thus, the exhaust gas side electrode 12 and the atmosphere side electrode 13 are formed in this manner, whereby the sensor element 11 is sandwiched by a pair of electrodes.

Then, a diffusion rate controlling layer 14 is laminated on one side surface of the exhaust side electrode 12 opposite to its side surface near the sensor element 11. The diffusion rate controlling layer 14 is a member which is composed of a porous material such as ceramics, etc., and which has a function to control the rate or speed of diffusion of the exhaust gas. Also, a protective layer 16 is laminated on one side surface of the diffusion rate controlling layer 14 opposite to its side surface near the sensor element 11. Then, a gas chamber 15 is formed between the sensor element 11 and the diffusion rate controlling layer 14. Here, note that it is not necessarily required to form the gas chamber 15, but it may instead be constructed so that the diffusion rate controlling layer 14 is in direct contact with the surface of the exhaust side electrode 12.

In addition, a heater layer 17 is laminated on the other side surface of the sensor element 11. A heater 18 is embedded in the heater layer 17, and the heater 18 can be supplied with electric power from an unillustrated outside electric circuit, so that it can heat the sensor body 100. Here, note that this electric circuit is electrically connected to the ECU 20, so that the electric power supplied to the heater 18 is controlled by the ECU 20. Then, an atmospheric chamber 19 is formed between the sensor element 11 and the heater layer 17. The atmospheric chamber 19 is placed in communication with the atmosphere through unillustrated atmospheric holes, so that even in a state where the air fuel ratio sensor 10 is arranged in the specific exhaust passage 5a, the atmosphere side electrode 13 is maintained in a state exposed to the atmosphere.

In such an air fuel ratio sensor 10, the exhaust gas introduced into the interior of the protective cover 10a from the vent holes 10d passes through the diffusion rate controlling layer 14, and reaches the exhaust gas side electrode 12. Then, when an application voltage is applied between the exhaust gas side electrode 12 and the atmosphere side electrode 13, oxygen in the exhaust gas or oxygen in the atmosphere becomes oxygen ions, which propagate through the sensor element 11. Then, the air fuel ratio of the exhaust gas is detected based on a saturation current value (limiting current value) at this time. Here, in the sensor element 11, oxygen ions do not propagate until the temperature of the sensor element 11 becomes equal to or higher than its activation temperature. Accordingly, when the temperature of the sensor element 11 is lower than the activation temperature, the sensor body 100 is heated to a desired temperature (e.g., 700 degrees C.) by means of the heater 18.

(Arrangement Structure of the Air Fuel Ratio Sensor)

As mentioned above, if the temperature of the sensor element 11 is lower than its activation temperature, oxygen ions do not propagate in the sensor element 11. For that reason, when the internal combustion engine 1 is in the cold state, the sensor body 100 is heated by the heater 18. On the other hand, when the internal combustion engine 1 is in the cold state, moisture in the exhaust gas can become condensed water in the exhaust passage 5, the specific exhaust passage 5a, the turbine 60a, a turbine scroll (not shown), and the bypass passage 602. Here, if the sensor body 100 has been wetted with the condensed water, the sensor element 11 heated by the heater 18 is cooled rapidly, thereby giving rise to a fear that the sensor element 11 may be cracked or broken. In addition, if the sensor body 100 has been wetted with the condensed water, it may become impossible to detect the air fuel ratio of the exhaust gas in an accurate manner. Thus, there is a fear that when the air fuel ratio sensor 10 arranged in the specific exhaust passage 5a is exposed to the condensed water, abnormality may occur in the air fuel ratio sensor 10. Here, note that an exhaust gas sensor in which the crack or breakage of its sensor element as mentioned above may occur is not limited to the air fuel ratio sensor 10, but the same crack or breakage may also occur in a sensor (e.g., an oxygen sensor, an NOx sensor, or the like) which has a sensor element composed of an oxygen ion conductive solid electrolyte, and a heater for raising the temperature of the sensor element. Accordingly, in case's where such sensors as the oxygen sensor, the NOx sensor, etc., are arranged in the specific exhaust passage 5a, each of these sensors also corresponds to an exhaust gas sensor in the present disclosure.

In addition, the ECU 20 controls the WGV 603 to the fully opened state, when the internal combustion engine 1 is in the cold state. In this case, the flow rate of the bypass exhaust gas becomes larger than the flow rate of the exhaust gas flowing out from the turbine 60a into the specific exhaust passage 5a (hereinafter, sometimes referred to as a "turbine exhaust gas"). Here, the condensed water flowing out from the bypass passage 602 into the specific exhaust passage 5a has a tendency to flow through the specific exhaust passage 5a, while being carried by the flow of the bypass exhaust gas. For that reason, when the internal combustion engine 1 is in the cold state, it becomes easy to cause sensor wetting by the condensed water flowing with the flow of the bypass exhaust gas. Further, the bypass exhaust gas is carried away by a flow of swirling exhaust gas (hereinafter, sometimes referred to as a "turbine swirling flow") which is a turbine exhaust gas flowing through the specific exhaust passage 5a while swirling along the wall surface thereof. Accordingly, in this embodiment, the air fuel ratio sensor is arranged in the circumferential direction of the specific exhaust passage 5a in a position except a range which is reached by the bypass exhaust gas carried away by the turbine swirling flow. Here, note that in this embodiment, the fully opened degree of the WGV 603 corresponds to a predetermined degree of opening in the present disclosure.

FIG. 5 is a diagram for explaining an arrangement structure of the air fuel ratio sensor 10 according to this embodiment. In FIG. 5, there is shown the turbine swirling flow in the cross section of a connection portion of the turbine housing 60 with the specific exhaust passage 5a shown in the above-mentioned FIG. 2B (this being able to be regarded as the same as the cross section of the specific exhaust passage 5a). Moreover, in FIG. 5, the direction of the flow of the bypass exhaust gas which is directed by the bypass passage 602 or the WGV 603 (i.e., the direction of the flow of the bypass exhaust gas in the case of assuming that it is not affected by the influence of the turbine swirling flow) is shown as an arrow C1. Here, in FIG. 5, it is assumed that the internal combustion engine 1 is in the cold state, and the WGV 603 is controlled to the fully opened state.

Here, the direction of the flow of the bypass exhaust gas is bent by the swirl direction of the swirling exhaust gas. In that case, the direction of the flow of the bypass exhaust gas carried away by the flow of the swirling exhaust gas (the turbine swirling flow) is bent to the swirl direction of the swirling exhaust gas as the bypass exhaust gas approaches the wall surface of the specific exhaust passage 5a, with respect to the direction of the flow of the bypass exhaust gas (arrow C1) directed by the bypass passage 602 or the WGV 603, as shown by an arrow C2 in FIG. 5. Moreover, in this embodiment, it is constructed such that when the WGV 603 is controlled to the fully opened state, the bypass exhaust gas may direct to the upstream side end face 70a, but an actual bypass exhaust gas at this time may diffuse, before flowing into the upstream side end face 70a, to some extent in the direction of the wall surface of the specific exhaust passage 5a at a side opposite to the side at which the outlet portion of the bypass passage 602 is arranged, in the transverse cross section of the specific exhaust passage 5a. In view of the above, a circulation region of the bypass exhaust gas when focusing on the cross section of the specific exhaust passage 5a will be indicated by a region R1 shown in FIG. 5.

Now, the above-mentioned will be arranged or reviewed based on FIG. 5 from a point of view of the circumferential direction of the specific exhaust passage 5a. Here, the bypass exhaust gas in the case of assuming that it is not carried away by the turbine swirling flow reaches a predetermined region R0 in the wall surface of the specific exhaust passage 5a. In contrast to this, the actual bypass exhaust gas is carried away by a predetermined angle D1 in the swirling direction of the exhaust gas around an axis of swirling of the turbine exhaust gas (indicated by point P1 on the cross section of the specific exhaust passage 5a). In that case, a range in the circumferential direction of the specific exhaust passage 5a which is reached by the bypass exhaust gas is set as a range A1 including a region to which the predetermined region R0 is moved by the predetermined angle D1 in the swirl direction of the swirling exhaust gas. Then, the condensed water flowing while being carried on the flow of the bypass exhaust gas may reach this range A1. Here, note that the predetermined angle D1 is set as an angle corresponding to a WGV opening degree at this time (in other words, a WGV opening degree at the time when the internal combustion engine 1 is in the cold state, and when the WGV 603 is at its fully opened degree). This is because the magnitude of the turbine swirling flow having an influence on the bypass exhaust gas changes according to the WGV opening degree.

Then, when the air fuel ratio sensor 10 is arranged in a position within a range except the range A1, i.e., within a range A2 in FIG. 5 in the circumferential direction of the specific exhaust passage 5a, the sensor wetting by the condensed water flowing while being carried on the flow of the bypass exhaust gas is suppressed. Here, note that even if the air fuel ratio sensor 10 is arranged in a position within the range A2 in the circumferential direction of the specific exhaust passage 5a, the air fuel ratio sensor 10 will be exposed to the turbine exhaust gas. For that reason, the exhaust gas will be introduced into the exhaust gas side electrode 12 of the air fuel ratio sensor 10, so that it becomes possible to detect the air fuel ratio of the exhaust gas by means of the air fuel ratio sensor 10.

According to the arrangement structure of the air fuel ratio sensor 10 stated above, in the construction in which the turbine outlet portion 601 and the upstream side end face 70a of the exhaust gas purification catalyst 70 are arranged close to each other and the air fuel ratio sensor 10 is arranged in the specific exhaust passage 5a, it becomes possible to suppress the wetting of the air fuel ratio sensor 10 with the condensed water.

<Second Embodiment>

Next, reference will be made to a second embodiment of the present disclosure based on FIG. 6. Here, note that in this second embodiment, the detailed explanation of substantially the same construction and substantially the same control processing as in the above-mentioned first embodiment will be omitted.

FIG. 6 is a diagram for explaining an arrangement structure of the air fuel ratio sensor 10 according to this second embodiment of the present disclosure. A stagnation region R2 of the condensed water is shown in FIG. 6, together with a circulation region R1 of the bypass exhaust gas shown in the above-mentioned FIG. 5. Thus, the condensed water can stagnate or stay in a region which is located inside the specific exhaust passage 5a in vertically downward direction. Here, in cases where the bypass passage 602 is formed below the turbine 60a, as shown for example in FIG. 6, the condensed water stagnating or staying in the specific exhaust passage 5a (hereinafter, sometimes referred to as "stagnant water") stays until arriving at a lower end of the outlet portion of the bypass passage 602. In this case, the stagnant water will exist in a range A3 in the circumferential direction of the specific exhaust passage 5a.

Then, not only when the air fuel ratio sensor 10 is arranged in the range A1 described in the first embodiment, but also when the air fuel ratio sensor 10 is arranged in the above-mentioned range A3, there is a fear that the air fuel ratio sensor 10 may get wet with water. Accordingly, in this second embodiment, the air fuel ratio sensor 10 is arranged in the circumferential direction of the specific exhaust passage 5a in a position except the range A1 and the range A3, i.e., in a position which falls within a range A4 and a range A5 in FIG. 6.

As a result of this, not only the sensor wetting by the condensed water contained in the bypass exhaust gas will be suppressed, but also the sensor wetting by the stagnant water will be suppressed. That is, according to the arrangement structure of the air fuel ratio sensor 10 of this second embodiment, too, in the construction in which the turbine outlet portion 601 and the upstream side end face 70a of the exhaust gas purification catalyst 70 are arranged close to each other and the air fuel ratio sensor 10 is arranged in the specific exhaust passage 5a, it becomes possible to suppress the wetting of the air fuel ratio sensor 10 with the condensed water.

<Modification of the Second Embodiment>

Next, reference will be made to a modification of the above-mentioned second embodiment of the present disclosure based on FIG. 7A, FIG. 7B and FIG. 8. Here, note that in this modification, the detailed explanation of substantially the same construction and substantially the same control processing as in the above-mentioned first and second embodiments will be omitted.

As shown in FIG. 7A, the turbine housing 60 according to this modification is provided with the turbine inlet portion 600, the turbine outlet portion 601, and the bypass passage 602, as in the above-mentioned FIG. 2A. In addition, the WGV 603 is arranged at the outlet side of the bypass passage 602, so that the flow of the bypass exhaust gas is directed to the upstream side end face 70a, in the state where the WGV 603 is in the fully opened state. Then, in this modification, as shown in FIG. 7B, the exhaust passage 5 connected at one end thereof to the exhaust manifold 50 extends downward, and the other end of the exhaust passage 5, which is opposite to the side connected to the exhaust manifold 50, is connected to the turbine housing 60. In the turbine housing 60 connected to such an exhaust passage 5, the turbine 60a is arranged below the bypass passage 602.

Then, an explanation will be hereinafter given to an arrangement of the air fuel ratio sensor 10 in such an exhaust system. FIG. 8 is a diagram for explaining an arrangement structure of the air fuel ratio sensor 10 according to this modification of the second embodiment. In FIG. 8, there are shown a region R1', which is a circulation region of the bypass exhaust gas, and a region R2', which is a stagnation region of the condensed water, as in the above-mentioned FIG. 6. Here, note that in this modification, the stagnant water can stay until arriving at the lower end of the turbine outlet portion 601.

Here, in the exhaust system shown in FIG. 8, the region R1' and the region R2' overlap with each other in the vicinity of the wall surface of the specific exhaust passage 5a, and a range in the circumferential direction of the specific exhaust passage 5a which can be reached by the bypass exhaust gas (this range being indicated as a range A1' in FIG. 8) is included in a range A3' in which the stagnant water may exist in the circumferential direction of the specific exhaust passage 5a. Accordingly, if the air fuel ratio sensor 10 is arranged in the range A3' in the circumferential direction of the, specific exhaust passage 5a, there will be a fear that the air fuel ratio sensor 10 may get wet with water. Thus, in this modification, the air fuel ratio sensor 10 is arranged in the circumferential direction of the specific exhaust passage 5a in a position except the range A3', i.e., in a position which falls within a range A4' in FIG. 8.

Then, according to the arrangement structure of the air fuel ratio sensor 10 of this modification, too, in the construction in which the turbine outlet portion 601 and the upstream side end face 70a of the exhaust gas purification catalyst 70 are arranged close to each other and the air fuel ratio sensor 10 is arranged in the specific exhaust passage 5a, it becomes possible to suppress the wetting of the air fuel ratio sensor 10 with the condensed water.

<Third Embodiment>

Next, reference will be made to a third embodiment of the present disclosure based on FIG. 9. Here, note that in this third embodiment, the detailed explanation of substantially the same construction and substantially the same control processing as in the above-mentioned first and second embodiments will be omitted.

FIG. 9 is a diagram for explaining an arrangement structure of the air fuel ratio sensor 10 according to this third embodiment of the present disclosure. In FIG. 9, there are shown a circulation region R1 of the bypass exhaust gas and a stagnation region R2 of the condensed water shown in FIG. 6. Here, the condensed water (stagnant water) stagnating or staying in the specific exhaust passage 5a is affected by the influence of the flow of the swirling exhaust gas (turbine swirling flow). Specifically, the stagnant water is blown up in the swirl direction of the swirling exhaust gas. At this time, as shown in FIG. 9, the stagnant water is blown up to a height of H1 at maximum from the water surface of the stagnant water (denoted by S1 in FIG. 9). In this case, the stagnant water will reach a range A6 in the circumferential direction of the specific exhaust passage 5a. Here, note that the range A6 is set as a range according to the WGV opening degree. This is because the magnitude of the turbine swirling flow having an influence on the blowing up of the stagnant water changes according to the WGV opening degree. Specifically, the turbine swirling flow becomes larger when the WGV opening degree is small than when it is large.

Accordingly, the smaller the WGV opening degree, the higher the maximum height to which the stagnant water is blown up tends to become, and the larger the above-mentioned range A6 tends to become.

Then, when the air fuel ratio sensor 10 is arranged in the region A6, too, there will be a fear that the air fuel ratio sensor 10 may get wet with water. Accordingly, in this third embodiment, the air fuel ratio sensor 10 is arranged in the circumferential direction of the specific exhaust passage 5a in a position except the range A1, the range A3 and the range A6, i.e., in a position which falls within the range A4 and a range A7 in FIG. 9. As a result of this, the wetting of the air fuel ratio sensor 10 is suppressed. Here, note that the range A6 is set as a range according to the WGV opening degree, as mentioned above, and hence, when arranged in this manner, the air fuel ratio sensor 10 will be arranged in accordance with a maximum blow-up height of the stagnant water, which changes according to the WGV opening degree.

In other words, according to the arrangement structure of the air fuel ratio sensor 10 of this third embodiment, in the construction in which the turbine outlet portion 601 and the upstream side end face 70a of the exhaust gas purification catalyst 70 are arranged close to each other and the air fuel ratio sensor 10 is arranged in the specific exhaust passage 5a, it becomes possible to suppress the wetting of the air fuel ratio sensor 10 with the condensed water.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An exhaust system for an internal combustion engine comprising:
    a turbocharger with a turbine that is arranged in an exhaust passage of said internal combustion engine;
    an exhaust gas purification catalyst that is arranged in said exhaust passage at a location downstream of said turbine;
    a bypass passage that branches from said exhaust passage at a location upstream of said turbine, and merges into said exhaust passage at a location upstream of said exhaust gas purification catalyst, while bypassing said turbine;
    a waste gate valve that is configured to change an exhaust gas channel cross section in said bypass passage; and
    an exhaust gas sensor that is arranged in a specific portion of said exhaust passage between said turbine and said exhaust gas purification catalyst;
    wherein said turbine and said exhaust gas purification catalyst are arranged in such a manner that an outlet portion of said turbine and an upstream side end face of said exhaust gas purification catalyst are in a predetermined proximity state, and an extension line of an axis of rotation of said turbine intersects the upstream side end face of said exhaust gas purification catalyst, without intersecting a wall surface of said specific portion of the exhaust passage;
    wherein the bypass exhaust gas flowing out from said bypass passage into said exhaust passage is directed to the upstream side end face of said exhaust gas purification catalyst when the internal combustion engine is in a cold state and a degree of opening of the waste gate valve is a predetermined degree of opening;
    said exhaust gas sensor being arranged in a circumferential direction of said specific portion of the exhaust passage in a position within a range of the circumference of the exhaust passage in which the exhaust gas sensor is positioned vertically downward in a direction of gravity but outside of a first range of the circumference in which stagnant water resulting from condensed water remains in said exhaust passage; and
    said exhaust gas sensor being arranged in the circumferential direction of said specific portion of the exhaust passage in a position within a range of the circumference of the exhaust passage outside of a second range of the circumference reached by the stagnant water blown up by swirling exhaust gas flowing out from the turbine.

2. The exhaust system for an internal combustion engine according to claim 1, wherein
    said second range includes a region to which said bypass exhaust gas, at the time when said internal combustion engine is in the cold state, has reached the wall surface of said specific portion of the exhaust passage without being carried away by said swirling exhaust gas and is moved by a predetermined angle in a swirl direction of said swirling exhaust gas.

3. The exhaust system for an internal combustion engine according to claim 1, wherein
    said exhaust gas sensor is further arranged in a position in a circumferential direction of said specific portion of the exhaust passage outside of a first range of the circumference of the exhaust passage that is a range reached by said bypass exhaust gas at the time when said internal combustion engine is in a cold state and said bypass exhaust gas is being carried away by the swirling exhaust gas flowing out from said turbine into said specific portion of the exhaust passage and flowing through said specific portion of the exhaust passage while swirling along the wall surface thereof.

* * * * *